(12) United States Patent
Phillips

(10) Patent No.: US 8,168,887 B2
(45) Date of Patent: May 1, 2012

(54) METHOD AND APPARATUS FOR PRE-FAB WIRING

(76) Inventor: Bruce G. Phillips, Gilbert, AZ (US)

( * ) Notice: Subject to any disclaimer, the term of this patent is extended or adjusted under 35 U.S.C. 154(b) by 876 days.

(21) Appl. No.: 12/199,648

(22) Filed: Aug. 27, 2008

(65) Prior Publication Data

US 2009/0084571 A1 Apr. 2, 2009

Related U.S. Application Data

(60) Provisional application No. 60/975,609, filed on Sep. 27, 2007.

(51) Int. Cl.
*H02G 3/08* (2006.01)
*B23P 19/00* (2006.01)
*H05K 13/04* (2006.01)

(52) U.S. Cl. ............. 174/50; 174/59; 174/481; 174/58; 220/3.2; 220/3.3; 248/906; 29/729; 29/745

(58) Field of Classification Search .................. 174/480, 174/481, 50, 53, 57, 58, 59, 66, 67, 112, 174/54; 220/3.2–3.9, 4.02, 241, 242; 29/729, 29/745, 592.1, 592; 248/906
See application file for complete search history.

(56) References Cited

U.S. PATENT DOCUMENTS

| | | | |
|---|---|---|---|
| 4,165,443 A * | 8/1979 | Figart et al. ..................... 174/53 |
| 4,569,458 A * | 2/1986 | Horsley ........................ 248/906 |
| 4,678,259 A | 7/1987 | Petit |
| 5,098,046 A * | 3/1992 | Webb ............................ 248/906 |
| 5,736,674 A | 4/1998 | Gretz |
| 6,180,879 B1 | 1/2001 | Gretz |
| 6,311,637 B1 * | 11/2001 | Moss ............................ 174/112 |
| 6,369,322 B1 | 4/2002 | Gretz |
| 6,723,918 B2 * | 4/2004 | Vrame ............................ 174/50 |
| 6,871,827 B2 * | 3/2005 | Petak et al. ..................... 174/58 |
| 6,955,559 B2 | 10/2005 | Pyrros |
| 6,996,943 B2 | 2/2006 | Denier et al. |
| 7,053,300 B2 | 5/2006 | Denier et al. |
| 7,098,399 B1 | 8/2006 | Gretz et al. |
| 7,189,928 B2 | 3/2007 | Denier |
| 7,192,289 B2 | 3/2007 | Kowalski |
| 7,259,337 B1 * | 8/2007 | Gretz ............................ 174/481 |
| 7,572,977 B2 * | 8/2009 | Gorman .......................... 174/58 |
| 7,754,967 B2 * | 7/2010 | Kruse et al. ..................... 174/53 |

* cited by examiner

*Primary Examiner* — Angel R Estrada
(74) *Attorney, Agent, or Firm* — Kenneth L. Green

(57) ABSTRACT

A bracket and junction box assembly and method allows simplified wiring at a prefab production facility and at a construction site. A junction box including a detachable and reattachable rear cover plate is pre-assembled with a plaster ring, electrical device, and leads attached to the switch or outlet, at a prefab facility. A Metal Clad (MC) cable may be attached to the junction box and wires carried in the MC Cable may be connected to the leads. A mounting bracket is generally sandwiched between the junction box and the plaster ring for mounting to framing members at the construction site. Following assembly at the prefab facility, the prefab junction box is shipped to the construction site where the bracket and junction box assembly is mounted to framing members. Connections to wires carried by MC Cables are then facilitated by removing the rear cover plate to access the interior of the junction box.

20 Claims, 6 Drawing Sheets

METHOD AND APPARATUS FOR PRE-FAB WIRING

The present application claims the priority of U.S. Provisional Patent Application Ser. No. 60/975,609 filed Sep. 27, 2007, which application is incorporated in its entirety herein by reference.

BACKGROUND OF THE INVENTION

The present invention relates to prefabricated wiring for buildings under construction and in particular to a method and apparatus for reducing steps required to be performed at the buildings under construction.

Buildings for both residential and commercial use are often constructed using prefabricated elements to reduce cost and construction time. Such prefabricated elements include structure, cabinetry, and electrical. As part of the prefabricated electrical elements, prefab junction box assemblies are commonly assembled off-site, shipped to the construction site, and integrated into the building. Known prefab box assemblies include a junction box, plaster ring, switch or outlet, and wiring. A mounting bracket may be sandwiched or otherwise attached between the junction box and the plaster ring to facilitate mounting the prefab box to framing members at the construction site. Wires are connected to the switch or outlet and are coiled inside the prefab box with wire nuts/connectors over ends of the wires. The prefab boxes require disassembly and reassembly at the prefab production facility and again at the construction site, including removing the plaster ring and electrical device (for example, a switch or an outlet), to access the wires inside the prefab box. Unfortunately, such disassembly and reassembly, and handling of the wires, is often time consuming and requires a trained electrician adding cost and schedule penalties to the construction project. Repeated assembly and disassembly also contributes to broken or loose wires which result in additional re-work and subsequent costs.

BRIEF SUMMARY OF THE INVENTION

The present invention addresses the above and other needs by providing a bracket and junction box assembly and method which allows simplified wiring at a prefab production facility and a construction site. A junction box including a detachable and reattachable rear cover plate is pre-assembled with a plaster ring, electrical device (for example, a switch or an outlet), and leads attached to the electrical device, at a prefab facility. A Metal Clad (MC) cable and/or Electrical Metal Tubing (EMT) may be attached to the junction box and wires carried in the MC Cable or EMT may be connected to the leads. A mounting bracket may be sandwiched between the junction box and the plaster ring for mounting to framing members at the construction site, or other mounting means may be used. Following assembly at the prefab facility, the prefab junction box is shipped to the construction site where the bracket and junction box assembly is mounted to framing members. Connections to wires carried by MC Cables or EMT is then facilitated by removing the rear cover plate to access the interior of the junction box.

In accordance with one aspect of the invention, there is provided a method for prefab wiring comprising the steps of constructing a bracket and junction box assembly at a prefab production facility using a junction box having an open rear and an attachable rear cover plate. The bracket and junction box assembly is shipped to a construction site and mounted to a framing member. Wiring at the construction site is accomplished through the open rear to access a junction box interior, connecting MC Cable or EMT to the junction box, connecting wires carried in the MC Cable or EMT to a electrical device attached to the junction box, and attaching the rear cover plate to the junction box.

In accordance with another aspect of the invention, there is provided a bracket and junction box assembly including a junction box having an open back and an attachable rear cover plate for attaching to the junction box over the open back. The bracket and junction box assembly further includes a plaster ring, a mounting bracket sandwiched between the plaster ring and the junction box (or other external mounting means), a switch or an outlet attached to the plaster ring, leads attached to the electrical device, labels on each lead identifying each lead, wire nuts/connector residing over free ends of each lead. The bracket and junction box assembly may further include a Metal Clad (MC) cable attached to the junction box and wires carried in the MC Cable or EMT connected to corresponding ones of the leads.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 2:
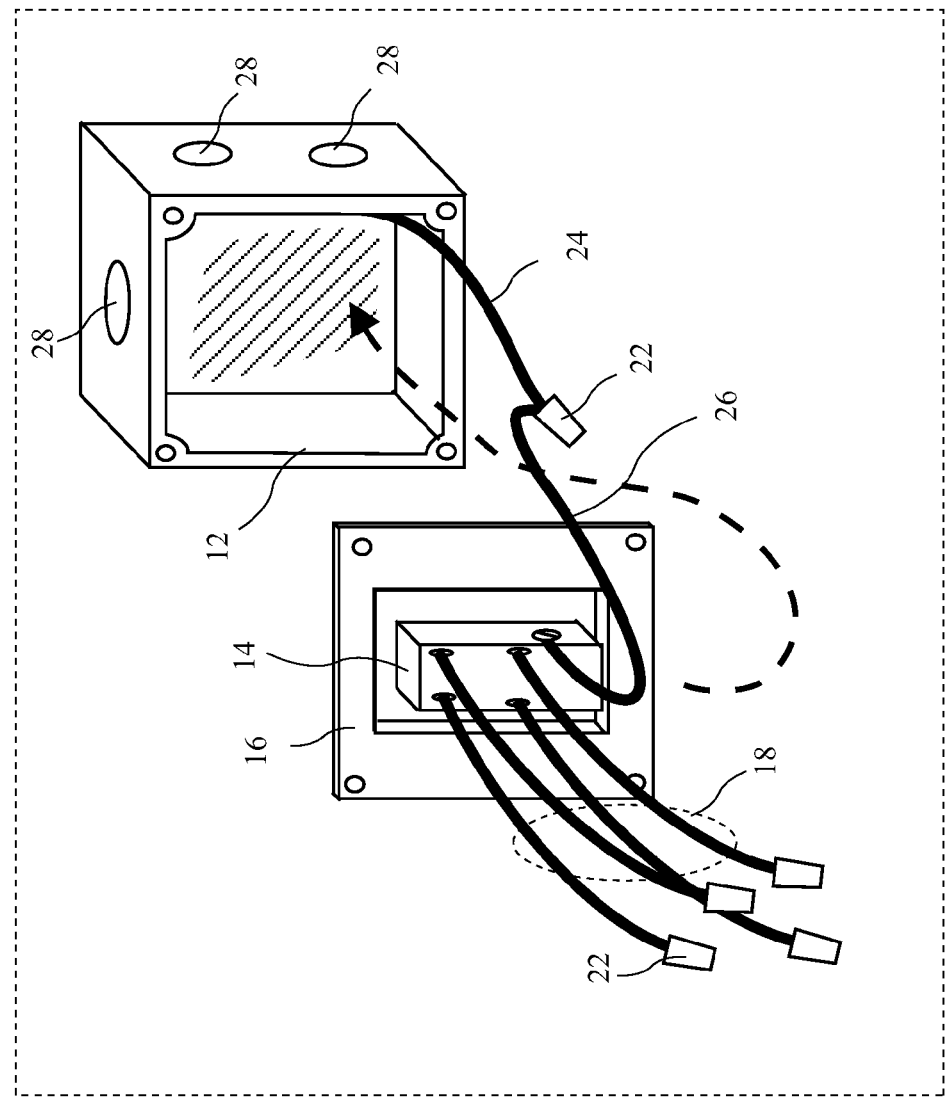
FIG. 2 is a second front perspective view of the prior art prefabricated junction box assembly with a plaster ring and outlet separated from the junction box.
Figure 1:
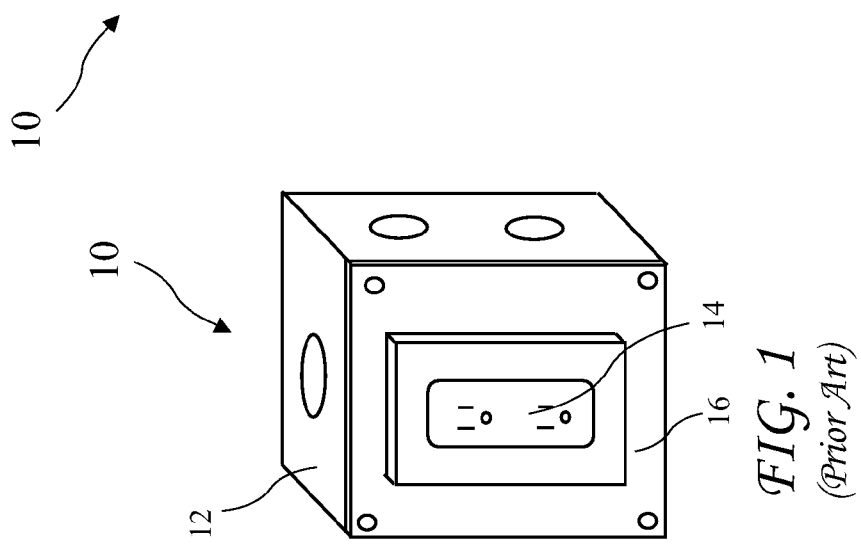
FIG. 1 is a front perspective view of a prior art prefabricated junction box assembly including a closed back junction box.

A front perspective view of a prior art prefabricated junction box assembly 10 is shown in FIG. 1 and a second front perspective view of the prior art prefabricated junction box assembly 10 with a plaster ring 16 and outlet 14 separated from a junction box 12 is shown in FIG. 2. Commonly used junction boxes 12 have a closed back and any internal wiring requires removing the plaster ring 16 or the outlet/switch 14 to access the box interior. The outlet 14 is pre-wired with wires 18 with wire nuts 22 over ends of the wires 18. A grounding pigtail 24 is connected to the junction box 12 and a grounding wire 26 is connected to the outlet 14 and connected by a wire nut 22 to the pigtail 24.

Figure 3:
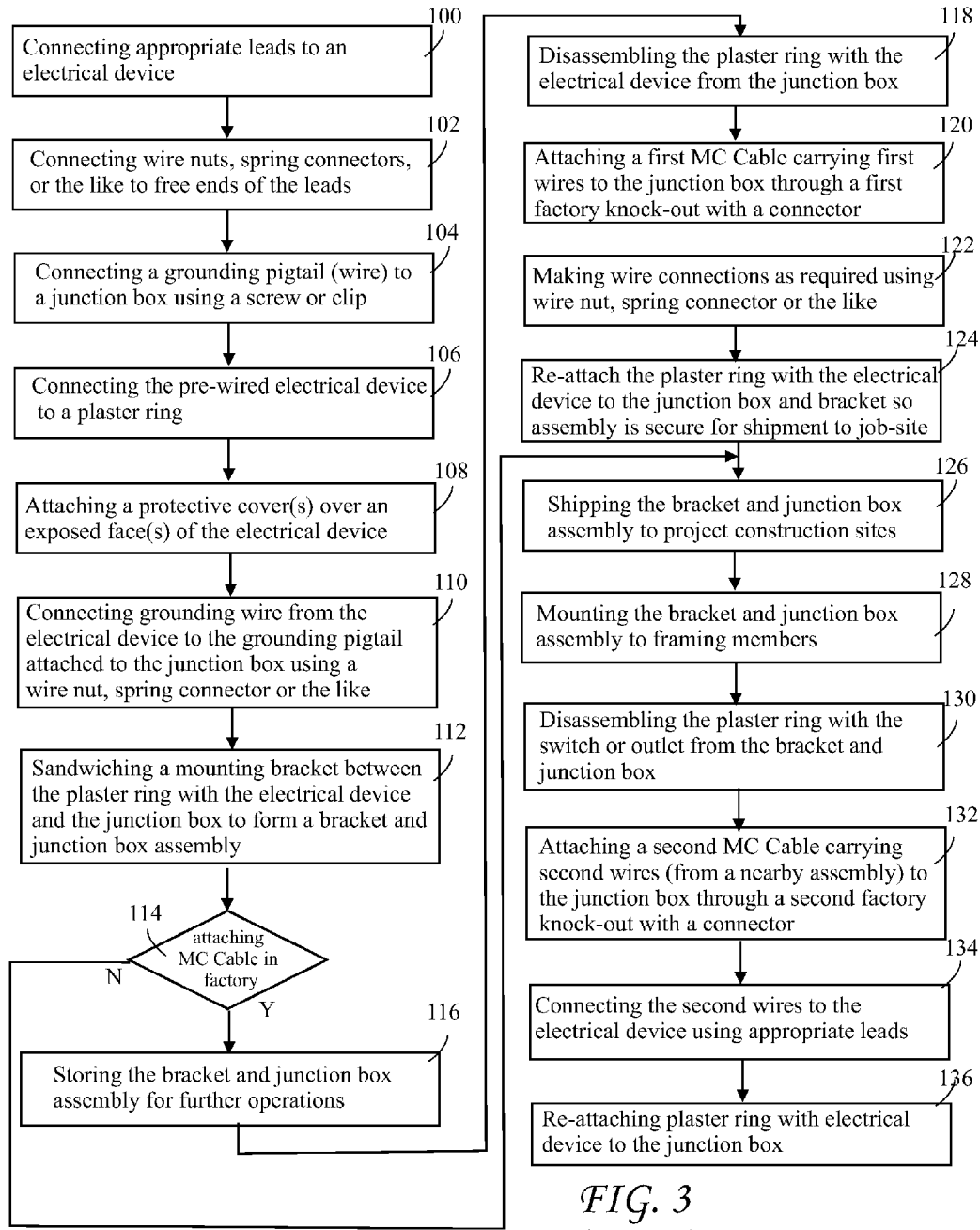
FIG. 3 is a prior art method for prefab wiring including constructing and installing the prior art prefabricated junction box.

FIG. 3 is a prior art method for prefab wiring including constructing and installing the prior art prefabricated junction box. The prior art method includes steps performed at a prefab facility and steps performed at a construction site. First, a junction box assembly is assembled at a prefab facility by the steps of connecting appropriate leads to an electrical device to form a pre-wired electrical device at step 100, connecting wire nuts, spring connectors, or the like to free ends of the leads at step 102, connecting a grounding pigtail (wire) to the junction box using a screw or a clip at step 104, connecting the pre-wired electrical device to a plaster ring at step 106, attaching protective cover(s) over exposed face(s) of the electrical device at step 108, connecting grounding wire from the electrical device to the grounding pigtail attached to the junction box using a wire nut, spring connector or the like at step 110, and sandwiching a mounting bracket between the plaster ring with the electrical device and a junction box to form a bracket and junction box assembly at step 112.

If an MC Cable is not to be attached at a prefab facility, skipping to step 126, if the MC Cable is to be attached at a prefab facility, at step 114, storing the bracket and junction box assembly for further operations at step 116, disassemble plaster ring with the electrical device from bracket and junction box to access junction box interior at step 118, attaching a first MC Cable carrying first wires to the junction box through a first factory knock-out with a connector at step 120, making wire connections as required using wire nut, spring connector or the like at step 122, re-attaching the plaster ring with the electrical device to the junction box and bracket so assembly is secure for shipment to job-site at step 124. In either case, shipping the bracket and junction box assembly to a construction site at step 126.

When assembly of the junction box assembly is complete, the following steps are carried out at the construction site. Mounting the bracket and junction box assembly to framing members at step 128, disassembling the plaster ring with the electrical device from the bracket and junction box at step 130, attaching a second MC Cable carrying second wires (from a nearby assembly) to the junction box through a second factory knock-out with a connector at step 132, connecting the second wires to the electrical device using appropriate leads at step 134, and re-attaching plaster ring with switches or outlet to the junction box at step 136. Unfortunately, step 132 of attaching a second MC Cable carrying second wires (from a nearby assembly) to the junction box through a second factory knock-out with a connector, is both difficult and time consuming because of the difficulty of working in the small space of the junction box interior with the leads attached to the electrical device and the wires carried by the MC Cables. Additionally, removing the plaster ring to obtaining better access to the junction box interior frees the junction box from the framing member creating further potential problems and repeated assembly and disassembly also contributes to broken or loose wires which result in additional re-work and subsequent costs.

Figure 5:
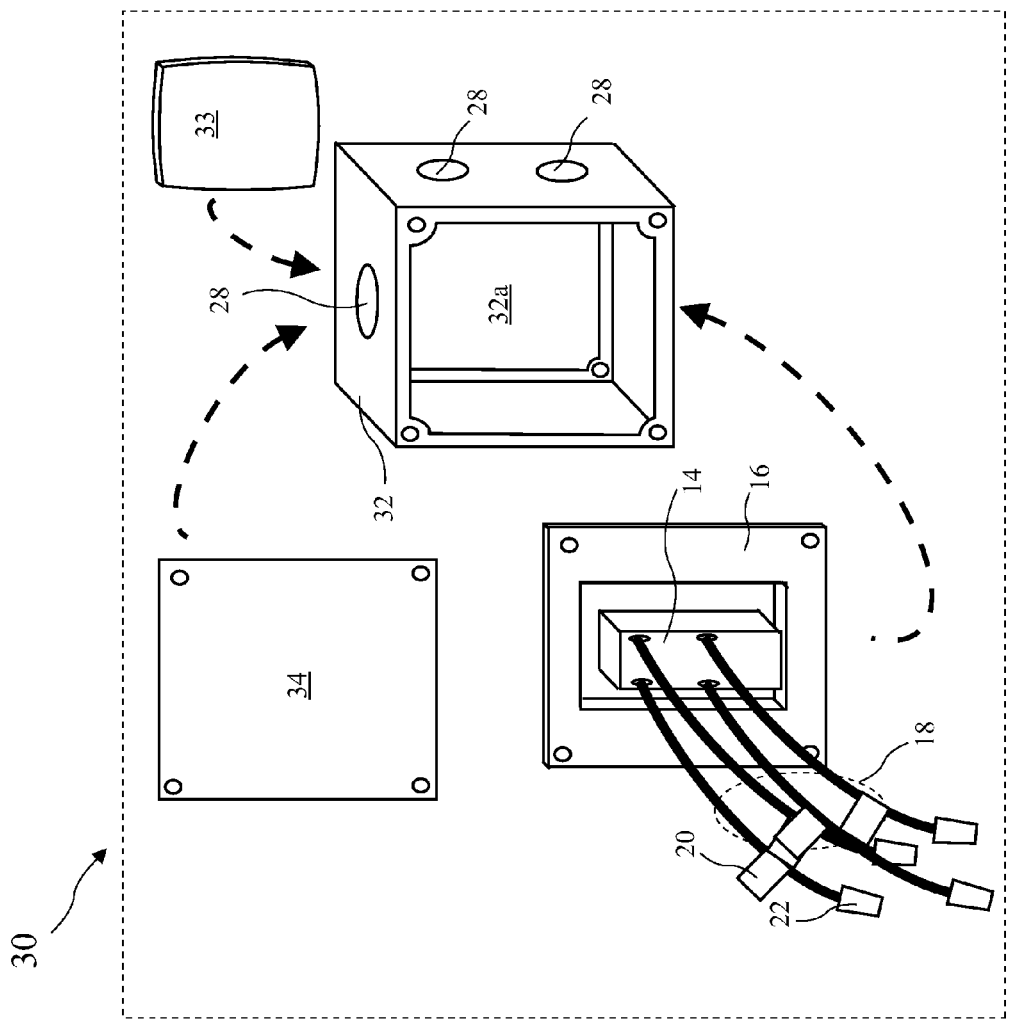
FIG. 5 is a rear perspective view of the junction box with a rear cover plate according to the present invention and plaster ring detached.
Figure 4:
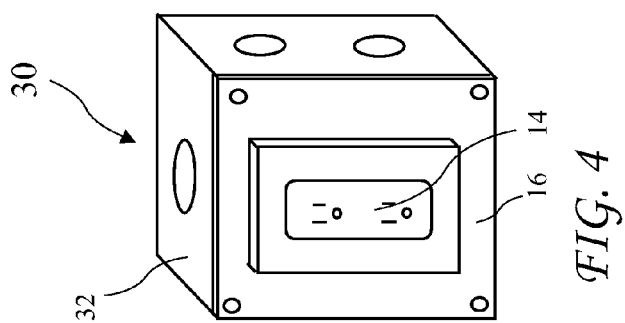
FIG. 4 is a front perspective view of a prefabricated junction box according to the present invention.

A front perspective view of a junction box assembly 30 according to the present invention without a bracket 36 (see FIGS. 6 and 7) is shown in FIG. 4 and an exploded perspective view of the junction box assembly 30 according to the present invention with a rear cover plate 34, and a plaster ring 16 and outlet 14, detached from a junction box 32 with an open back 32a is shown in FIG. 5. The junction box assembly 30 is shown with an outlet 14 attached to the plaster ring 16 but may also have a switch or other electrical device attached. Leads 18 are connected to the outlet 14 and labels 20 attached to identify each lead. Wire nuts 22 (or alternatively spring connectors or the like) reside over free ends of the leads 20. A fire putty pad 33 may also be inserted into the junction box 32 where required for "rated" walls. The fire putty pad 33 may be a separate element or maybe attached to a second embodiment of the rear cover plate 34. The open back 32a is seen to be a single opening, opening nearly the entire back of the junction box 32, and may be about the same size opening as the opening in the face of the junction box 32.

Figure 7:
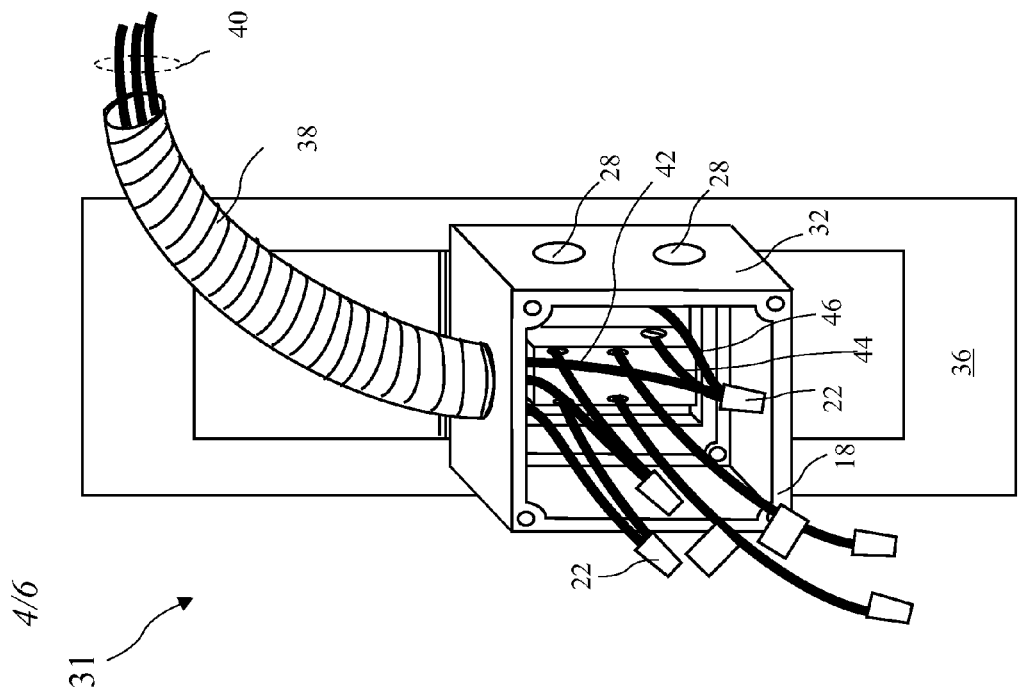
FIG. 7 is a rear perspective view of a bracket and junction box assembly according to the present invention with the rear cover plate removed and a metal clad (MC) cable or Electrical Metal Tubing (EMT) attached to the junction box and wires carried by the MC Cable or EMT connected to leads in the junction box.
Figure 6:
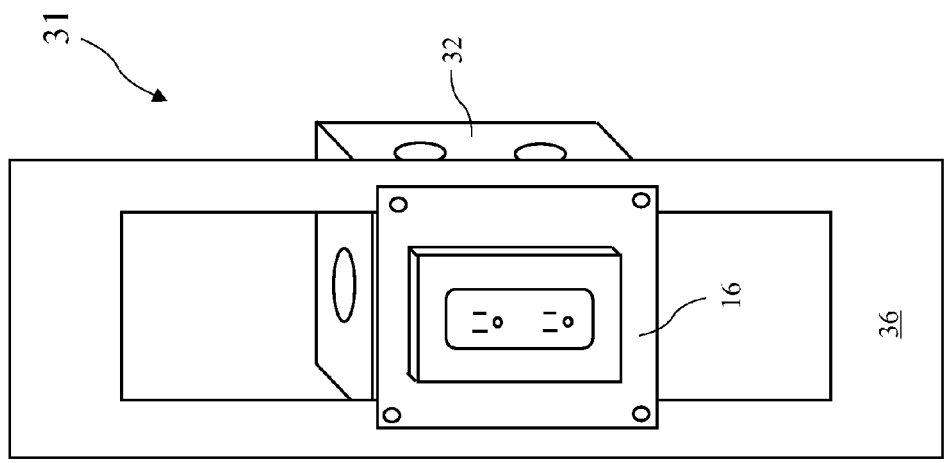
FIG. 6 is a front perspective view of a bracket and junction box assembly according to the present invention.

A front perspective view of a completed bracket and junction box assembly 31 according to the present invention, including the mounting bracket 36, is shown in FIG. 6 and a rear perspective view of the bracket 36 and junction box assembly 31 with the rear cover plate 34 (see FIG. 5) removed and a metal clad (MC) cable 38 attached to the junction box 32 and wires 40 carried by the MC Cable 38 connected to leads 18 in the junction box 32, are shown in FIG. 7. The bracket 36 is sandwiched between the plaster ring 16 and the junction box 32. The MC Cable 38 is connected to the junction box 32 through a knock out 28 (also see FIG. 5) and two of the wires 40 enter the junction box 32 and are connected to two of the leads 18 using the wire nuts 22. A ground wire 42 carried in the MC Cable 38 is connected to a grounding pigtail 46, which grounding pigtail 46 is connected to the junction box 32, and to a ground lead 44 connected to the outlet 14, all connected by the wire nut 22. The bracket and junction box assembly 31 may be assembled at the prefab production facility with or without the MC Cable 38 and wires 40, and more than one MC Cable 38 may be similarly connected to the junction box 32 at the prefab facility.

Figure 8:
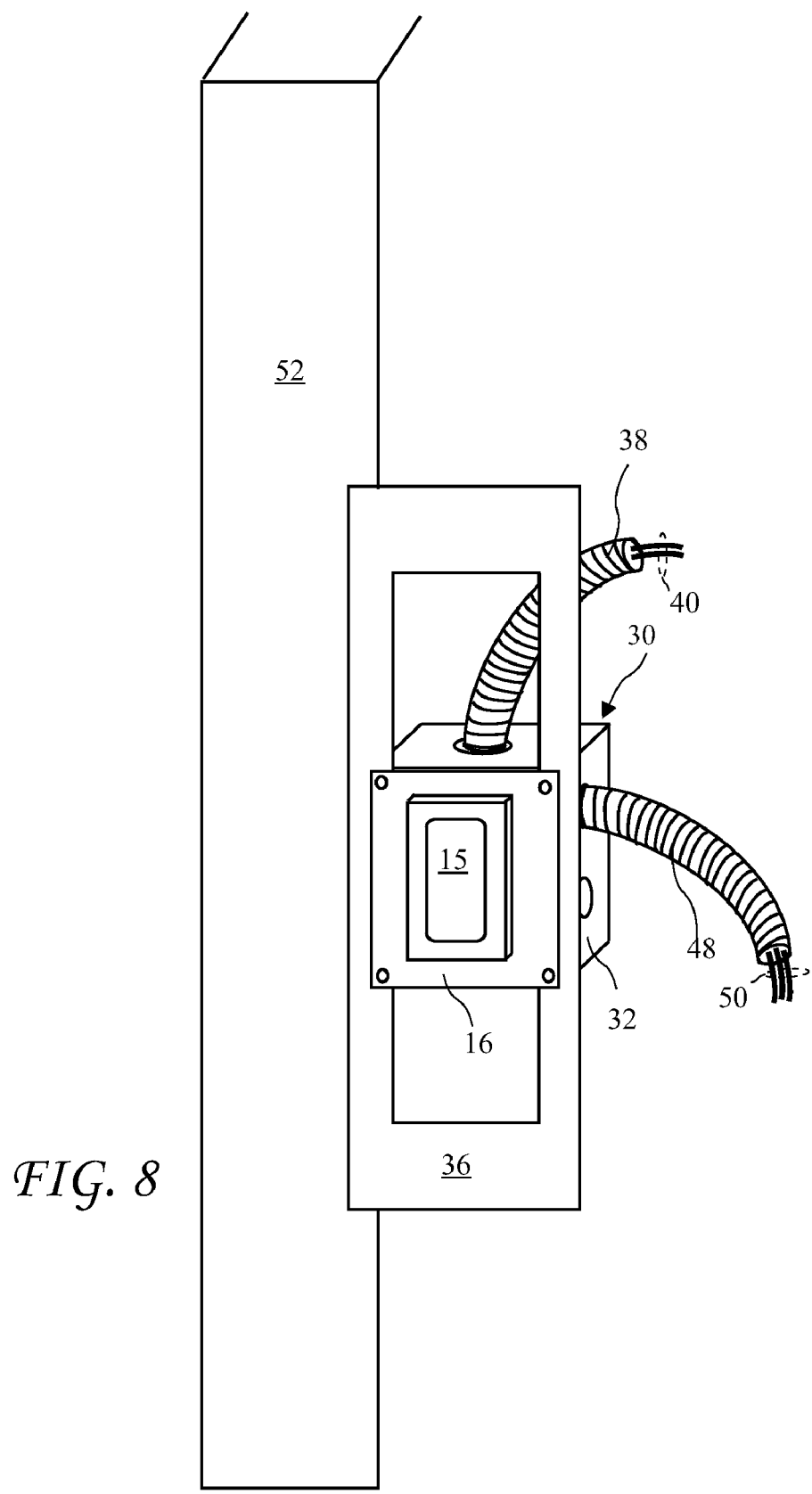
FIG. 8 is a front perspective view of a bracket and junction box assembly attached to a frame member.

A front perspective view of the bracket and junction box assembly 31 attached to a frame member 52 is shown in FIG. 8. The bracket 36 attaches to the frame member 52. A second (or site) MC Cable 48 is attached to the junction box 32 at the construction site, which MC Cable 48 may be the only MC Cable attached to the junction box 32. The MC Cable 48 is attached through a knock-out 28 (see FIG. 7). The MC Cable 48 carries additional wires 50 which are connected to corresponding leads 18 inside the box 32 in the same manner as described in FIG. 7, and more than one MC Cable 48 may be similarly connected to the junction box 32 at the prefab facility. A protective cover 15 preferably attached at the prefab facility is shown placed over the outlet 14 to prevent damage to the outlet 14.

Figure 9:
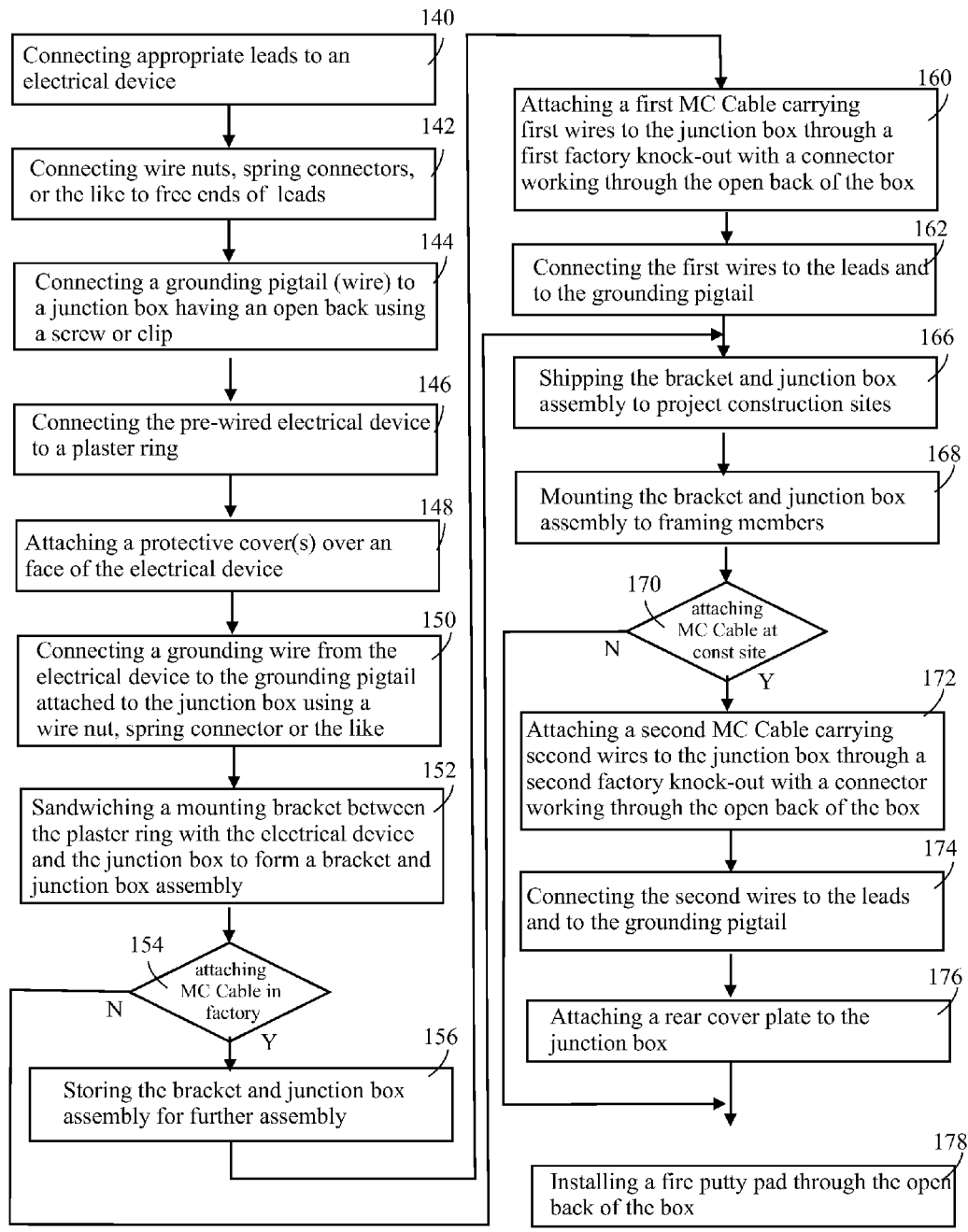
FIG. 9 is a method according to the present invention for prefab wiring including constructing and installing the prefabricated junction box according to the present invention.

FIG. 9 is a method according to the present invention for prefab wiring including constructing and installing the junction box assembly according to the present invention. The method according to the present invention includes steps performed at the prefab facility to assembly the junction box assembly having a junction box with an open back and steps performed at the construction site to install the junction box assembly performing wiring through the open back. First, a junction box assembly is assembled at a prefab facility by the steps of connecting appropriate leads to an electrical device to form a pre-wired electrical device at step 140, connecting wire nuts, spring connectors, or the like to the free ends of leads at step 142, connecting a grounding pigtail (wire) to a junction box having an open back using a screw or clip at step 144, connecting the pre-wired electrical device to a plaster ring at step 146, attaching protective cover(s) over a face of the electrical device at step 148, connecting a grounding wire from the electrical device to the grounding pigtail attached to the junction box using either a wire nut, spring connector or the like at step 150, sandwiching a mounting bracket between the plaster ring with the electrical device and the junction box to form a bracket and junction box assembly at step 152, checking if an MC Cable will be attached in the off-site prefab facility at step 154, if the MC Cable will be attached, storing the bracket and junction box assembly for further assembly at step 156, attaching a first (or prefab) MC Cable carrying first wires to the junction box through a first factory knock-out, with a connector, working through the open back of the junction box, at step 160, and connecting the first wires to corresponding leads and the grounding pigtail using wire nuts, spring connectors or the like at step 162. In either case, shipping the bracket and junction box assembly to a construction site at step 166. While step 160 describes attaching a first MC Cable, the method may include attaching two or more MC Cables.

When assembly of the junction box assembly is complete, the following steps are later performed at the construction site. Mounting the bracket and junction box assembly to framing members at step 168, checking if a second (or site) MC Cable will be attached to the junction box assembly at the construction site at step 170 and skipping past step 176 if the second MC Cable is not being attached. If the second MC Cable is being attached at the construction site, attaching the second MC Cable carrying second wires (usually from a nearby junction box assembly) to the junction box through a second factory knock-out, with a connector, working through the open back of the box, at step 172, connecting the second wires to the appropriate leads and the grounding pigtail at step 174, and re-attaching the rear cover plate to the junction box at step 176. In some construction sites, for example where "rated" walls are required, a fire putty pad may also be easily inserted through the open back of the junction box at step 178. While step 172 describes attaching a second MC Cable, the method may include attaching two or more MC Cables.

The junction box assembly has been described above for uses where wires are carried to the junction box in MC Cables. In other embodiments of the present invention, wires may be carried to the junction box in any electrical conduit including Rigid Metal Conduit (RMC), Rigid Nonmetallic Conduit (RNC), Galvanized rigid conduit (GRC), Electrical Metallic Tubing (EMT), Electrical Nonmetallic Tubing (ENT), Flexible Metallic Conduit (FMC), Liquidtight Flexible Metal Conduit (LFMC), Flexible Metallic Tubing (FMT), Liquidtight Flexible Nonmetallic Conduit (LNFC), Aluminium conduit, Intermediate metal conduit (IMC), PVC conduit, other metal conduits, and underground conduit. Preferred electrical conduits are MC Cable and Electrical Metallic Tubing (EMT). In these other embodiments, the apparatus and methods of the present invention, namely working through the open back of a junction box, provide benefits similar to wiring using MC Cables.

While the invention herein disclosed has been described by means of specific embodiments and applications thereof, numerous modifications and variations could be made thereto by those skilled in the art without departing from the scope of the invention set forth in the claims.

I claim:

1. A prefab bracket and open back junction box assembly comprising:
    an open back junction box having an open front for mounting an electrical device and plaster ring, and an open back comprising a single opening about the same size as the open front and opposite the open front for accepting a detachable rear cover plate;
    a plaster ring attached to the open back junction box;
    a mounting bracket sandwiched between the plaster ring and the junction box;
    an electrical device attached to the plaster ring;
    a protective cover over a face of the electrical device;
    first ends of electrical leads attached to the electrical device;
    labels proximal to a second end of each electrical lead identifying each lead;
    wire nuts residing over free ends of each electrical lead; and
    a detachable rear cover plate attached to the back of the open back junction box over the open back while leaving the second ends of the leads inside the junction box and unattached.

2. The prefab bracket and open back junction box assembly of claim 1, further including an electrical conduit attached to the open back junction box and carrying wires extending into the open back junction box, the wires attached to the electrical leads.

3. The assembly of claim 1, further including a first end of a grounding pigtail connected to the junction box and a first end of a grounding wire connected to the electrical device.

4. The assembly of claim 3, wherein the second ends of the grounding pigtail and grounding wire reside inside the junction box and unattached.

5. A method for prefab wiring comprising the steps of:
    constructing a junction box assembly at a prefab production facility using an open back junction box having an open front for mounting an electrical device and plaster ring, and an open back opposite the open front for receiving a detachably attachable rear cover plate, constructing the junction box assembly comprising:
        attaching an electrical device to a plaster ring; and
        attaching the electrical device and plaster ring to the open back junction box;
    shipping the junction box assembly to a construction site; and
    installing the junction box assembly at a work site without disassembling the junction box, electrical device and mud ring, including the steps of:
        mounting the junction box assembly to a framing member;
        connecting a site electrical conduit to the open back junction box working through the open back of the open back junction box;
        connecting site wires carried in the electrical conduit to the electrical device attached to the junction box working through the open back of the box; and
        attaching the rear cover plate to the back of the open back junction box.

6. The method of claim 5, wherein attaching the electrical device and plaster ring to the open back junction box includes sandwiching a bracket between the electrical device and plaster ring and the open back junction box.

7. The method of claim 5, wherein constructing and installing the junction box assembly includes:
    connecting first ends of leads to the electrical device at the prefab production facility leaving second ends of the leads opposite the first ends unterminated;
    not detaching the leads from the electrical device at the work site; and
    connecting the site wires to the second ends of the leads through the open back of the open back junction box.

8. The method of claim 5, wherein constructing the junction box assembly includes attaching a protective cover over a face of the electrical device.

9. The method of claim 5, wherein constructing the junction box assembly includes:
attaching a prefab electrical conduit to the open back box at the prefab production facility; and
not detaching the electrical conduit from the open back junction box at the work site.

10. The method of claim 9, wherein constructing the junction box assembly includes:
connecting first ends of leads to the electrical device at the prefab production facility leaving second ends of the leads opposite the first ends unterminated;
connecting prefab wires carried by the prefab electrical conduit to the leads at the prefab production facility; and
not detaching the leads from the electrical device at the work site.

11. The method of claim 10, wherein the electric conduit is selected from Metal Clad (MC) Cable and Electrical Metal Tubing (EMT).

12. The method of claim 5, wherein installing the junction box assembly at a work site further includes installing a fire putty pad through the open back of the open back junction box.

13. The method of claim 5, wherein attaching the rear cover plate to the back of the open back junction box comprises attaching the rear cover plate having a fire putty pad attached, to the back of the open back junction box.

14. The method of claim 7, wherein constructing the junction box assembly includes:
attaching labels to the leads proximal to the second ends of the leads to identify the leads.

15. The method of claim 5, wherein the open back is about the same size opening as the open front.

16. The assembly of claim 5, wherein the completed installation of the junction box assembly performed at the work site is performed without making electrical connections working through the open front of the junction box.

17. A method for constructing an open back prefab junction box assembly comprising the steps of:
constructing a junction box assembly at a prefab production facility using an open back junction box having an open front for mounting an electrical device and plaster ring, and an open back comprising a single opening about the same size as the open front and opposite the open front for accepting a detachably attachable rear cover plate, the constructing the junction box assembly comprising:
connecting first ends of leads to an electrical device;
attaching labels proximal to second ends opposite the first ends of the leads;
attaching the electrical device to a plaster ring;
attaching a protective cover over a face of the electrical device;
attaching the electrical device and plaster ring to the open front of the open back junction box; and
attaching the rear cover plate to the open back of the open back junction box while leaving the second ends of the leads inside the junction box and unattached.

18. The method of claim 17, wherein:
attaching the electrical device and plaster ring to the open front of the open back junction box comprises:
attaching the electrical device and plaster ring to the open front of the open back junction box comprises with a mounting bracket sandwiched between the plaster ring and the open back junction box.

19. The method of claim 17, further including connecting a grounding pigtail to the junction box and a grounding wire to the electrical device before attaching the electrical device and plaster ring to the open front of the open back junction box.

20. The method of claim 19, further including connecting attaching the rear cover plate to the open back of the open back junction box while leaving the grounding pigtail and the grounding wire inside the junction box.

\* \* \* \* \*